(12) United States Patent
Adachi

(10) Patent No.: US 7,623,305 B2
(45) Date of Patent: Nov. 24, 2009

(54) IMAGE CAPTURING LENS AND IMAGING APPARATUS

(75) Inventor: Nobuyuki Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/811,861

(22) Filed: Jun. 12, 2007

(65) Prior Publication Data

US 2008/0144193 A1 Jun. 19, 2008

(30) Foreign Application Priority Data

Jun. 14, 2006 (JP) .............................. 2006-164905

(51) Int. Cl.
*G02B 13/04* (2006.01)

(52) U.S. Cl. ........................ 359/749; 359/680; 359/754

(58) Field of Classification Search ................ 359/680, 359/686, 689, 691, 749–756, 761, 763, 770; 396/72–88; 348/240.99–240.3, 335–369
See application file for complete search history.

(56) References Cited

U.S. PATENT DOCUMENTS 6,671,103 B2 * 12/2003 Itoh ........................... 359/689

FOREIGN PATENT DOCUMENTS

| JP | 2000-193884 A | 7/2000 |
| JP | 2000-275514 A | 10/2000 |

* cited by examiner

*Primary Examiner*—Darryl J Collins
(74) *Attorney, Agent, or Firm*—Wolf, Greenfield & Sacks, P.C.

(57) ABSTRACT

An image capturing lens including: in order from an object side, a first lens group having a negative refractive power; a stop; and a second lens group having a positive refractive power; the first lens group including, in order from the object side, a first lens in a meniscus shape having a convex surface which faces the object side and a negative refractive power, and a second lens in a meniscus shape having a convex surface which faces the object side and a positive refractive power, and the second lens group including, in order from the object side, a third lens in a double-convex shape having a positive refractive power, a fourth lens in a double-concave shape having a negative refractive power, and a fifth lens having a positive refractive power.

6 Claims, 3 Drawing Sheets

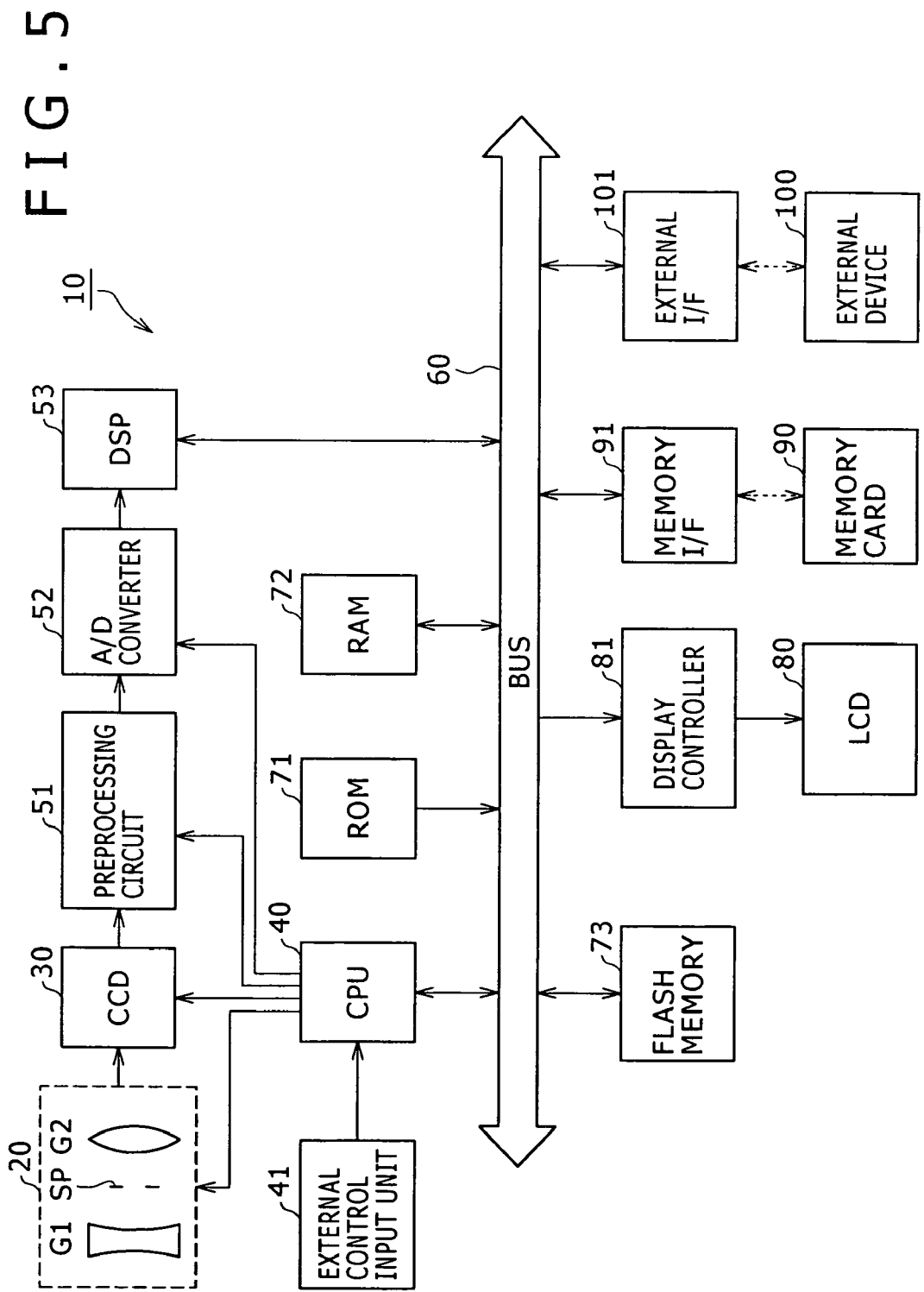

IMAGE CAPTURING LENS AND IMAGING APPARATUS

CROSS REFERENCES TO RELATED APPLICATIONS

The present invention contains subject matter related to Japanese Patent Application JP 2006-164905 filed in the Japanese Patent Office on Jun. 14, 2006, the entire contents of which being incorporated herein by reference.

BACKGROUND OF THE INVENTION

1. Field of the Invention

The present invention relates to an image capturing lens and an imaging apparatus, and more particularly to an image capturing lens which has a high image focusing capability and is bright and compact, for use with a digital camera and a video camera, and an imaging apparatus employing such an image capturing lens.

2. Description of the Related Art

With the increasing popularity of game machines for home use in recent years, digital cameras have become widely used as an image input device for capturing figure images into computers. There have been demands for digital cameras which are capable of capturing higher-resolution images, are smaller in size, have improved camera specifications including larger aperture ratios, wider angle settings, and smaller distortions, and are lower in cost.

Heretofore, there have been known retrofocus image capturing lenses as wide-angle, large-aperture image capturing lenses including a front lens group having a negative refractive power and a rear lens group having a positive refractive power.

For example, compact large-aperture image capturing lenses are disclosed in Japanese Patent Laid-open No. 2000-275514 and Japanese Patent Laid-open No. 2000-193884.

SUMMARY OF THE INVENTION

However, the image capturing lens disclosed in Japanese Patent Laid-open No. 2000-275514 has a small field angle of about 32 degrees and a large distortion of −3%. The image capturing lens disclosed in Japanese Patent Laid-open No. 2000-193884 has a desirable field angle of about 40 degrees, but has a large distortion ranging from −4 to −5%. An example of the latter image capturing lens includes a cemented lens in a second lens group (rear lens group), which makes it difficult for the image capturing lens to be reduced in cost.

According to the embodiments of the present invention, it is desirable to provide an image capturing lens having improved aberrations, particularly an improved distortion, which is suitable for use with a digital still camera and a digital video camera, and an imaging apparatus employing such an image capturing lens.

According to one embodiment of the present invention, there is provided an image capturing lens including: in order from an object side, a first lens group having a negative refractive power, a stop; and a second lens group having a positive refractive power. The first lens group including, in order from the object side, a first lens in a meniscus shape having a convex surface which faces the object side and a negative refractive power, and a second lens in a meniscus shape having a convex surface which faces the object side and a positive refractive power. The second lens group including, in order from the object side, a third lens in a double-convex shape having a positive refractive power, a fourth lens in a double-concave shape having a negative refractive power, and a fifth lens having a positive refractive power.

According to another embodiment of the present invention, there is provided an imaging apparatus including an image capturing lens and an image pickup device for converting an optical image formed by the image capturing lens into an electric signal. The image capturing lens includes, in order from an object side, a first lens group having a negative refractive power and a second lens group having a positive refractive power. The first lens group including, in order from an object side, a first lens in a meniscus shape having a convex surface which faces the object side and a negative refractive power, and a second lens in a meniscus shape having a convex surface which faces the object side and a positive refractive power. The second lens group including, in order from the object side, a third lens in a double-convex shape having a positive refractive power, a fourth lens in a double-concave shape having a negative refractive power, and a fifth lens having a positive refractive power.

The image capturing lens according to the embodiments of the present invention has improved aberrations, particularly an improved distortion.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a block diagram of an imaging apparatus according to the embodiments of the present invention.

DETAILED DESCRIPTION OF THE PREFERRED EMBODIMENTS

Figure 1:
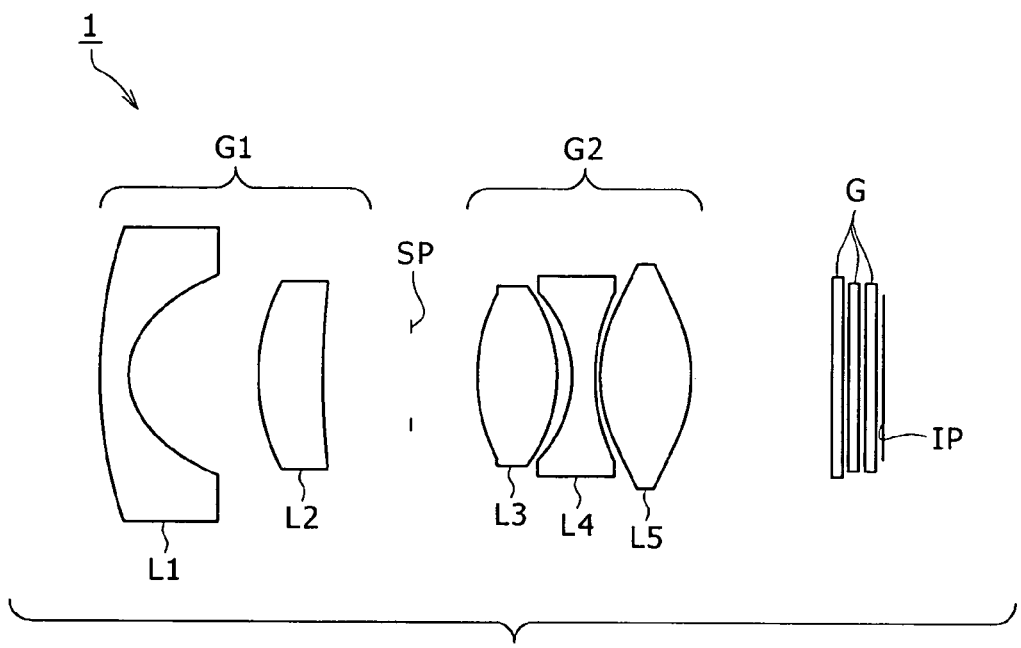
FIG. 1 is a view showing an image capturing lens according to a first embodiment of the present invention.

Hereinafter, the detailed description of the preferred embodiments of an image capturing lens and an imaging apparatus according to the present invention will be described with referring to the figures and the tables.

An image capturing lens according to the present invention will be described below.

The image capturing lens including: in order from an object side, a first lens group having a negative refractive power, a stop; and a second lens group having a positive refractive power. The first lens group including, in order from the object side a first lens in a meniscus shape having a convex surface which faces the object side and a negative refractive power, and a second lens in a meniscus shape having a convex surface which faces the object side and a positive refractive power. The second lens group including, in order from the object side, a third lens in a double-convex shape having a positive refractive power, a fourth lens in a double-concave shape having a negative refractive power, and a fifth lens having a positive refractive power.

With the first lens group and the second lens group being positioned successively from the object side, since the image capturing lens has a long back focus, the angle of incidence on an imaging apparatus can be reduced at an edge image height. The reduced angle of incidence is a factor required to keep brightness from the center of the image to the edge thereof in an imaging apparatus incorporating a solid-state imaging device such as a CCD (Charge-Coupled Device) or a CMOS (Complementary Metal-Oxide Semiconductor). The imaging apparatus is suitable for use with a digital still camera or a digital video camera as an image capturing lens.

If a stop is disposed intermediate between the first lens group and the second lens group, then since upper and lower rays of peripheral light can deliberately be masked with ease by the first and second lens groups, the image capturing lens can have reduced coma for off-axis rays and hence an increased resolution.

Generally, a retrofocus image capturing lens suffers a large negative distortion as a whole because the negative distortion caused by a first lens group and the negative distortion caused by positive lens elements behind the stop are in the same direction. According to the present invention, the second lens includes a positive meniscus lens having a concave surface which faces an image side. The distortion caused by the first lens and the distortion caused by the second lens are thus put into balance for an overall small distortion.

If it is assumed SagR1(ymax) denotes deformation of an aspherical surface with respect to a generating spherical surface on an object-side surface of the second lens at a maximum image height Ymax, and SagR2(ymax) denotes deformation on an image-side surface of the second lens at the maximum image height Ymax, the image capturing lens according to the present invention should preferably satisfy the following conditional formula (1):

$$SagR1(ymax)/SagR2(ymax) > 0 \quad (1)$$

The conditional formula (1) is pertinent to the aspherical shape of the second positive meniscus lens, and serves to correct coma and astigmatism in particular for off-axis rays that pass through the second lens. On both the object-side and image-side surfaces of the second lens, the distortion of the aspherical surface from the optical axis thereof toward the peripheral edge thereof should preferably be greater toward the image side with respect to the generating spherical surface.

If the distortion ratio exceeds the conditional formula (1), then the effect of the aspherical surface is reduced to make it difficult to correct coma and astigmatism. The distortion of the aspherical surface refers to a distortion with respect to the generating spherical surface at a height corresponding to the maximum image height of the lens surface. It will be assumed that the positive direction is set toward the image-plane side along the optical axis.

If it is assumed F1 denotes a composite focal length of said first lens group, F2 denotes a composite focal length of said second lens group, f denotes an overall focal length of said image capturing lens, f3 denotes a focal length of said third lens of the second lens group, and f4 denotes a focal length of said fourth lens of the second lens group, the image capturing lens according to the present invention should preferably satisfy the following conditional formulas (2), (3), and (4):

$$0.9 < f3/f < 1.7 \quad (2)$$

$$0.06 < |f4/f| < 1.1 \quad (3)$$

$$1.4 < |F1/F2| < 2.5 \quad (4)$$

The third lens in a double-convex shape, which is positioned on an image side of the stop, is desirable to reduce the size of the first lens group. Particularly, it is desirable for the third lens in a double-convex shape to satisfy the conditional formula (2). If the focal length of the third lens increases beyond the upper limit of the conditional formula (2), then the angle of exit of outermost edge rays traveling from the stop toward the object side increases, making the first lens group larger in diameter. Therefore, the focal length of the third lens beyond the upper limit of the conditional formula (2) is not suitable for reducing the size of the image capturing lens. If the focal length of the third lens decreases beyond the lower limit of the conditional formula (2), then the image capturing lens has an increased back focus. Therefore, the focal length of the third lens beyond the lower limit of the conditional formula (2) is not desirable.

The conditional formula (3) applies to the focal length of the fourth lens. If the focal length of the fourth lens increases beyond the upper limit of the conditional formula (3), then since the back focus of the image capturing lens increases, it is difficult to reduce the overall length of the optical system of the image capturing lens. If the focal length of the fourth lens decreases beyond the lower limit of the conditional formula (3), then it is difficult to hold distortion at image corners.

The conditional formula (4) serves to reduce the size of the lens groups and bring the exit pupil to a far position. If F1 is reduced or F2 is increased beyond the upper limit of the conditional formula (4), then the diameter of the first lens group increases, and the Petzval sum increases and the curvature of the image plane becomes too under-corrected, making it difficult to achieve a flat image plane. If the focal length ratio exceeds the upper limit of the conditional formula (4), then the second lens group becomes large in size and the magnification of the second lens group increases, making it difficult to correct the distortion and the chromatic difference of magnification which are caused by the first lens group, within the second lens group.

In the image capturing lens according to the present invention, the first lens should desirably have at least one aspherical surface. If the first lens has an aspherical surface on its image side, then the deformation of the aspherical surface from the axis toward the edge should preferably be smaller toward the edge with respect to the generating spherical surface, for thereby minimizing the distortion caused by the first lens group.

All the five lenses of the image capturing lens according to the present invention should preferably include plastic lenses to allow the image capturing lens to be manufactured inexpensively. Since it is easy to form spherical surfaces on the plastic lenses, it is possible to make all lens surfaces as aspherical surfaces for correcting the aberrations well for higher lens performance.

Specific embodiments of the image capturing lens according to the present invention and Numerical Examples thereof will be described below with reference to following drawings and tables.

FIG. 1 shows a lens configuration of an image capturing lens 1 according to a first embodiment of the present invention. As shown in FIG. 1, the image capturing lens 1 includes a first lens group G1 having a negative refractive power, a stop SP, and a second lens group G2 having a positive refractive power, the first lens group G1, the stop SP, and the second lens group G2 being positioned successively from an object side. The first lens group G1 includes a first lens in a meniscus shape L1 having a convex surface which faces the object side and a negative refractive power, and a second lens in a meniscus shape L2 having a convex surface which faces the object side and a positive refractive power, the first lens in a meniscus shape L1 and the second lens in a meniscus shape L2 being positioned successively from the object side. The second lens group G2 includes a third lens in a double-convex shape L3 having a positive refractive power, a fourth lens in a double-concave shape L4 having a negative refractive power, and a fifth double-convex lens L5 having a positive refractive power, the third lens in a double-convex shape L3, the fourth lens in a double-concave shape L4, and the fifth double-convex lens L5 being positioned successively from the object side. Optical filters G are interposed between a final lens surface and an image plane IP.

surface, "Nd" the d-line (wavelength=587.6 nm) of the glass material having the ith surface on its object side, and "vd" the Abbe number at the d-line of the glass material having the ith surface on its object side. With respect to "R", "∞" indicates that the surface is a flat surface. In the equation (1), "K" represents the conical constant, and "A", "B", "C", and "D" fourth, sixth, eighth, and tenth aspherical coefficients, respectively. With respect to the aspherical coefficients, "E–i" represents an exponential notation with a base of 10, i.e., "$10^{-i}$". For example, "0.12345E–05" represents "$0.12345 \times 10^{-5}$".

TABLE 1 f5.35 ω35.4* Fno2.6

| | R | D | Nd | vd | k | A | B | C | D |
|---|---|---|---|---|---|---|---|---|---|
| 1 | 12.91434 | 1.43 | 1.53 | 55.8 | −20 | | | | |
| 2 | 2.982 | 5.83 | | | −1.127407 | 2.013910E−04 | 6.377660E−05 | −1.953960E−06 | 5.727760E−08 |
| 3 | 10.55356 | 3 | 1.585 | 30 | 0 | −1.185010E−04 | 8.322030E−06 | 1.559770E−08 | 2.128960E−08 |
| 4 | 72.59478 | 4 | | | 0 | −1.331240E−04 | 1.650290E−06 | 8.620700E−07 | 5.482950E−09 |
| 5(Si) | ∞ | 2.98 | | | | | | | |
| 6 | 6.47757 | 9.7 | 1.53 | 55.8 | −0.19233 | −1.279470E−04 | −6.241350E−05 | 8.141870E−06 | −3.902920E−07 |
| 7 | −5.61194 | 0.7 | | | 0.261486 | 4.156520E−05 | 1.136580E−04 | 1.116920E−06 | −1.571930E−07 |
| 8 | −4.33248 | 1 | 1.565 | 30 | −1.243691 | −8.807650E−04 | 2.577640E−04 | −1.960100E−05 | 5.539420E−07 |
| 9 | 7.86675 | 0.25 | | | −17.369817 | 3.219650E−03 | −1.929010E−04 | 5.410580E−06 | −4.301580E−08 |
| 10 | 6.0536 | 4.2 | 1.53 | 55.8 | −7.565944 | 1.624120E−03 | −1.014570E−04 | 3.915720E−06 | −6.291600E−08 |
| 11 | −6.36161 | 6.47 | | | 0.304327 | 8.705040E−04 | 7.747810E−05 | 2.503590E−07 | 1.809300E−08 |
| 12 | ∞ | 0.55 | 1.5163 | 64.1 | | | | | |
| 13 | ∞ | 0.2 | | | | | | | |
| 14 | ∞ | 0.45 | 1.5163 | 64.1 | | | | | |
| 15 | ∞ | 0.2 | | | | | | | |
| 16 | ∞ | 0.5 | 1.5163 | 64.1 | | | | | |
| 17 | ∞ | | | | | | | | |

The image capturing lens 1 may have focus corrected, i.e., focusing performed, with any of the lens groups upon movement of an object point, or may have an ability to create a large depth of field for achieving a wide focusing range.

All the lens surfaces of the image capturing lens 1 are aspherical. If each of the aspherical surfaces has a radius r of curvature at its vertex, a conical constant K, and fourth, sixth, eighth, and tenth aspherical coefficients A, B, C, D in an orthogonal coordinate system having an origin at the vertex of the aspherical surface and an X-axis as the optical axis, then the deformation ΔH(h) of the aspherical surface is expressed by the equation (1) shown below. ΔH(effh) represents the position of a highest light ray passing through the third lens on the image side as a height from the X-axis (hereinafter referred to as an effective radius), and ΔH(effh×0.7) the position at 70% of the effective radius.

$$\Delta H(h) = \frac{\frac{h^2}{r}}{1 + \sqrt{1 - (1+k)\frac{h^2}{r^2}}} + Ah^4 + Bh^6 + Ch^8 + Dh^{10} \quad (1)$$

Figure 2:
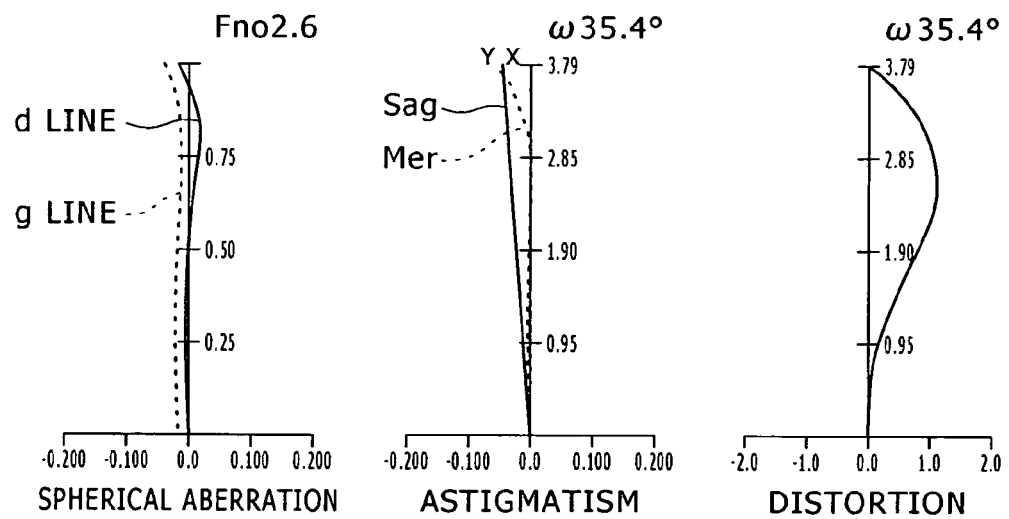
FIG. 2 is a diagram showing spherical aberration, astigmatism, and distortion of Numerical Example 1 of the image capturing lens according to the first embodiment.

Table 1 shows lens data of Numerical Example 1 where specific numerical values are applied to the image capturing lens 1 according to the first embodiment of the present invention. In Table 1 and other tables described below, "f" represents the focal length of the overall image capturing lens, "ω" the half field angle, "Fno" the F number, "Si" an ith surface counted from the object side, "R" the radius of curvature of the surface Si, "D" the surface-to-surface distance between the ith surface counted from the object side and the (i+1)th FIG. 2 shows the spherical aberration, astigmatism, and distortion of the image capturing lens according to Numerical Example 1. In the diagram showing the spherical aberration, the vertical axis represents the open F value, the horizontal axis the defocus, the d-line the spherical aberration at a wavelength of 587.6 nm, and the g-line the spherical aberration at a wavelength of 435.8 nm. In the diagram showing the astigmatism, the vertical axis represents the image height, the horizontal axis the defocus, Sag the sagittal image plane, and Mer the meridional image plane. In the diagram showing the distortion, the vertical axis represents the image height, and the horizontal axis the percentage.

If the image capturing lens 1 is incorporated in a small-size information device for actual use, a low-pass filter and a lid glass panel of an image pickup device are disposed between the second lens group G2 and the light-detecting surface of the image pickup device. According to the present invention, when the image capturing lens 1 is designed, a filter made of a glass material corresponding to BK7 (commercial name) manufactured by Ohara Corporation is positioned closely to the focus surface to take into account effects that the low-pass filter and the lid glass panel of the image pickup device have.

Figure 3:
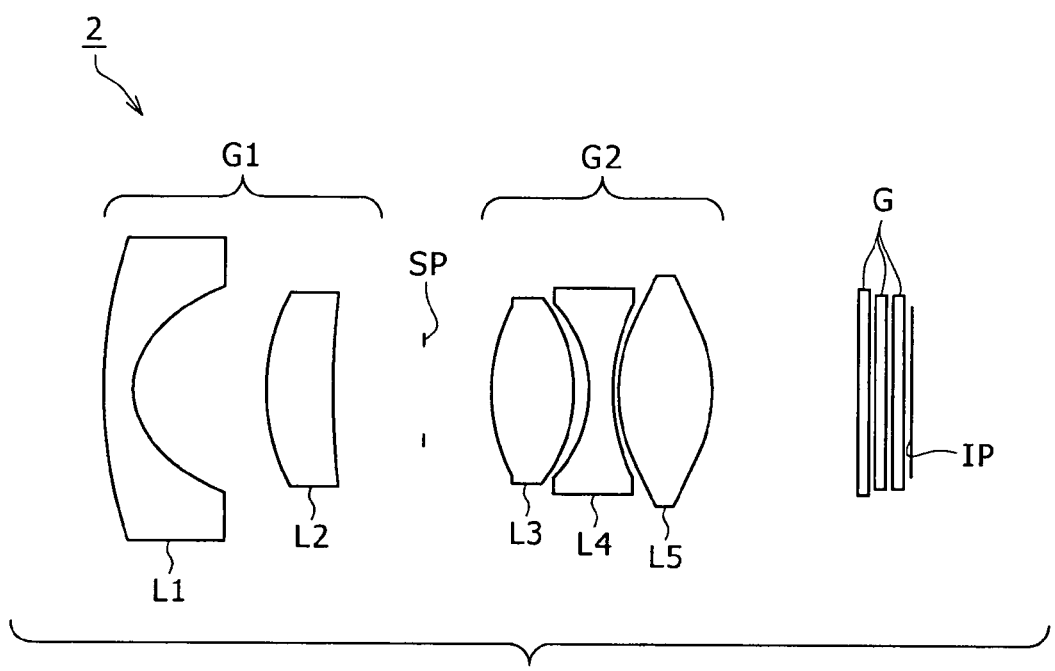
FIG. 3 is a view showing an image capturing lens according to a second embodiment of the present invention.

FIG. 3 shows a lens configuration of an image capturing lens 2 according to a second embodiment of the present invention. As shown in FIG. 3, the image capturing lens 2 includes a first lens group G1 having a negative refractive power, a stop SP, and a second lens group G2 having a positive refractive power, the first lens group G1, the stop SP, and the second lens group G2 being positioned successively from an object side. The first lens group G1 includes a first lens in a meniscus shape L1 having a convex surface which faces the object side and a negative refractive power, and a second lens in a meniscus shape L2 having a convex surface which faces the object side and a positive refractive power, the first lens in a meniscus shape L1 and the second lens in a meniscus shape L2 being positioned successively from the object side. The second lens group includes a third lens in a double-convex shape L3 having a positive refractive power, a fourth lens in a double-concave shape L4 having a negative refractive power, and a fifth double-convex lens L5 having a positive refractive power, the third lens in a double-convex shape L3, the fourth lens in a double-concave shape L4, and the fifth double-convex lens L5 being positioned successively from the object side. Optical filters G are interposed between a final lens surface and an image plane IP.

The image capturing lens 2 may have focus corrected, i.e., focusing performed, with any of the lens groups upon movement of an object point, or may be arranged to have an ability to create a large depth of field for achieving a wide focusing range.

All the lens surfaces of the image capturing lens 2 are aspherical. The aspherical surfaces are expressed by the above equation (1).

Table 2 shows lens data of Numerical Example 2 where specific numerical values are applied to the image capturing lens 2 according to the second embodiment of the present invention.

face to take into account effects that the low-pass filter and the lid glass panel of the image pickup device have.

Table 3 shows values in the conditional formulas (1) through (4), and the focal lengths of the lens groups and the lenses (f1: the focal length of the first lens L1, f2: the focal length of the second lens L2, f5: the focal length of the fifth lens 15) of Numerical Examples 1, 2.

TABLE 3

|  | Numerical Example 1 | Numerical Example 2 |
|---|---|---|
| f | 5.35 | 5.25 |
| F1 | −21.552 | −18.58 |
| F2 | 10.004 | 10.07 |
| f1 | −7.808 | −7.7 |
| f2 | 20.558 | 22.63 |
| f3 | 6.981 | 7.78 |
| f4 | −4.595 | −4.392 |
| f5 | 6.604 | 5.82 |
| Conditional formula 1 | 0.8 | 0.6 |
| Conditional formula 2 | 1.31 | 1.48 |
| Conditional formula 3 | 0.86 | 0.84 |

TABLE 2 f5.25 ω35.7* Fno2

| Si | R | D | Nd | vd | k | A | B | C | D |
|---|---|---|---|---|---|---|---|---|---|
| 1 | 29.12039 | 1.43 | 1.53 | 55.8 | −2.00000E+01 | 0.00000E+00 | 0.00000E+00 | 0.00000E+00 | 0.00000E+00 |
| 2 | 3.53321 | 6.15 | | | −1.12741E+00 | 1.11440E−03 | 1.35573E−05 | −2.48723E−07 | 1.36429E−08 |
| 3 | 10.88375 | 3 | 1.585 | 30 | 0.00000E+00 | 2.21480E−04 | 2.60732E−05 | −1.18339E−06 | 4.98393E−08 |
| 4 | 52.79447 | 4 | | | 0.00000E+00 | 3.30808E−04 | 4.15963E−05 | −2.99533E−06 | 1.73594E−07 |
| 5 | ∞ | 2 | | | | | | | |
| 6 | 9.45363 | 3.7 | 1.53 | 55.8 | −1.82330E−01 | −2.64794E−04 | −1.39472E−05 | 1.99083E−06 | −9.17762E−08 |
| 7 | −6.36768 | 1.2 | | | 2.61496E−01 | −1.15570E−04 | 1.33039E−04 | −5.53331E−06 | 8.00048E−08 |
| 8 | −4.53204 | 1 | 1.585 | 30 | −1.24363E+00 | −5.53751E−06 | 1.69602E−04 | −1.62143E−05 | 4.55478E−07 |
| 9 | 6.54851 | 0.25 | | | −1.73898E+01 | 2.72920E−03 | −1.87320E−04 | 4.50875E−06 | −3.07620E−08 |
| 10 | 4.63623 | 4.2 | 1.53 | 55.8 | −7.56594E+00 | 2.11228E−03 | −1.26227E−04 | 4.58704E−06 | −7.19378E−08 |
| 11 | | | | | | | | | |
| 12 | −6.38633 | 6.47 | | | 3.04327E−01 | 1.26973E−03 | 2.64373E−05 | 7.09702E−07 | −3.64413E−09 |
| 13 | ∞ | 0.55 | 1.5163 | 64.1 | | | | | |
| 14 | ∞ | 0.2 | | | | | | | |
| 15 | ∞ | 0.45 | 1.5163 | 64.1 | | | | | |
| 16 | ∞ | 0.2 | | | | | | | |
| 17 | ∞ | 0.5 | 1.5163 | 64.1 | | | | | |

Figure 4:
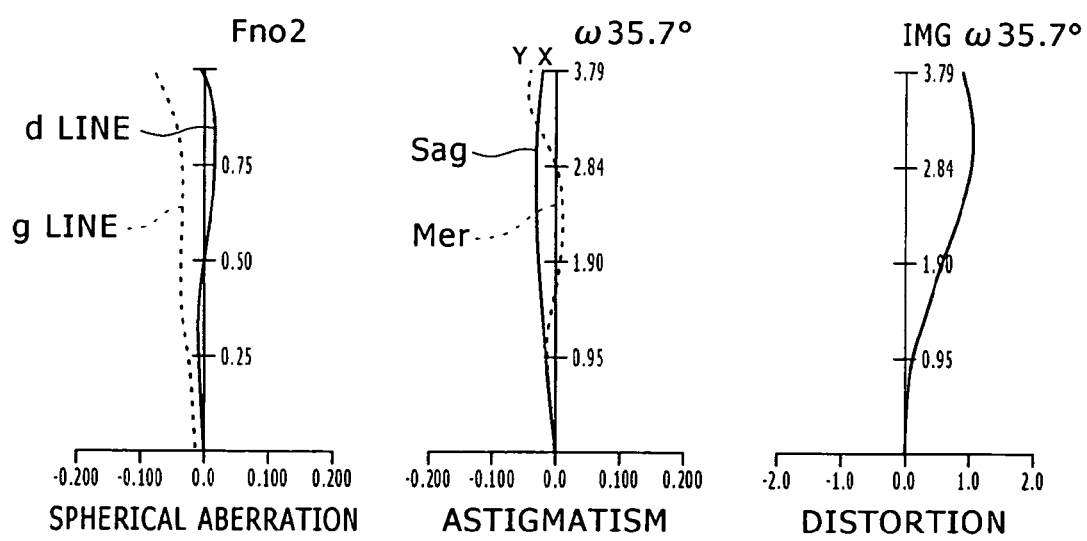
FIG. 4 is a diagram showing spherical aberration, astigmatism, and distortion of Numerical Example 2 of the image capturing lens according to the second embodiment.

FIG. 4 shows the spherical aberration, astigmatism, and distortion of the image capturing lens according to Numerical Example 2. In the diagram showing the spherical aberration, the vertical axis represents the open F value, the horizontal axis the defocus, the d-line the spherical aberration at a wavelength of 587.6 nm, and the g-line the spherical aberration at a wavelength of 435.8 nm. In the diagram showing the astigmatism, the vertical axis represents the image height, the horizontal axis the defocus, Sag the sagittal image plane, and Mer the meridional image plane. In the diagram showing the distortion, the vertical axis represents the image height, and the horizontal axis the percentage.

If the image capturing lens 1 is incorporated in a small-size information device for actual use, a low-pass filter and a lid glass panel of an image pickup device are disposed between the second lens group G2 and the light-detecting surface of the image pickup device. According to the second embodiment, when the image capturing lens 1 is designed, a filter made of a glass material corresponding to BK7 (commercial name) made by Ohara is positioned closely to the focus sur- TABLE 3-continued

|  | Numerical Example 1 | Numerical Example 2 |
|---|---|---|
| Conditional formula 4 | 2.15 | 1.85 |

The image capturing lenses according to Numerical Examples 1, 2 satisfy the conditional formulas (1) through (4). As shown in the tables and the aberration diagrams, the image capturing lenses according to Numerical Examples 1, 2 are of a simple lens configuration, have a wide field angle, are bright, are small in size, produce small aberrations, in particular, a small distortion, and have a high optical performance. According to the present invention, there is provided a large-diameter retrofocus image capturing lens having an exit pupil sufficiently . spaced from the image plane, has a reduced overall length, a wide field angle of 65 degrees or greater for capturing images, and an F number ranging from 2.0 to 2.6.

An imaging apparatus according to the present invention will be described below.

The imaging apparatus includes an image capturing lens and an image pickup device for converting an optical image formed by the image capturing lens into an electric signal. The image capturing lens includes, in order from an object side, a first lens group having a negative refractive power and a second lens group having a positive refractive power; the first lens group including, in order from the object side, a first lens in a meniscus shape having a convex surface which faces the object side and a negative refractive power, and a second lens in a meniscus shape having a convex surface which faces the object side and a positive refractive power, the second lens group including, in order from the object side, a third lens in a double-convex shape having a positive refractive power, a fourth lens in a double-concave shape having a negative refractive power, and a fifth lens having a positive refractive power.

FIG. 5 shows in block form an internal configuration of a digital still camera constructed as the imaging apparatus according to the present invention.

As shown in FIG. 5, the digital still camera, generally denoted by 10, includes an image capturing lens 20 and an image pickup device 30 for converting an optical image formed by the image capturing lens 20 into an electric signal. The digital still camera 10 has a CPU (Central Processing Unit) 40 for controlling various components thereof. The image capturing lens 20 includes the image capturing lens according to the present invention, e.g., the image capturing lens 1 according to the first embodiment of the present invention. Alternatively, the image capturing lens 20 may include the image capturing lens 2 according to the second embodiment of the present invention, or any of image capturing lenses according to the present invention other than the embodiments and numerical examples. The image pickup device 30 may be a solid-state image pickup device such as a CCD (Charge-Coupled Device) or a CMOS (Complementary Metal-Oxide Semiconductor).

An optical image formed by the image capturing lens 20 is detected by the image pickup device 30, which transmits a photoelectrically converted image signal to a preprocessing circuit 51. The preprocessing circuit 51 preprocesses the image signal supplied from the image pickup device 30 to remove noise from the image signal and adjust the gain of the image signal. The preprocessing circuit 51 supplies the preprocessed image signal to an A/D (Analog-to-Digital) converter 52.

The A/D converter 52 converts the supplied analog image signal into a digital image signal, and outputs the digital image signal to a DSP (Digital Signal Processor) 53.

The DSP 53 generates control signals including an AF (Automatic Focus) signal, an AE (Automatic Exposure) signal, and an AWB (Automatic White Balance) signal based on the digital image signal supplied from the A/D converter 52, and supplies the generated control signals through a bus 60 to the CPU 40. The DSP 53 also compresses the supplied digital image signal, and supplies the compressed image signal data through the bus 60 to a RAM (Random Access Memory) 72. The DSP 53 also expands compressed image signal data received from the RAM 72.

The CPU 40 controls the components of the digital still camera 10 and performs various processing operations according to a program stored in a ROM (Read Only Memory) 71 or a program loaded from a flash memory 73 into the RAM 72. The RAM 72 also stores data for the CPU 40 to perform various processing operations and data being processed by the CPU 40.

An external control input unit 41 for accepting operations from the user is connected to the CPU 40. The external control input unit 41 has various buttons including a release button, a menu button, etc., a dial for setting aperture values, shutter speeds, a zooming, a focusing, etc., and knobs (all not shown). When operated by the user, the external control input unit 41 supplies operation information representing operations of the user to the CPU 40. Based on the supplied operation information, the CPU 40 performs various processing operations.

The CPU 40 also controls operation of the preprocessing circuit 51 and the A/D converter 52 based on the operation information input from the user through the external control input unit 41, control information supplied from the DSP 53, and information produced when various programs are executed. The CPU 40 also controls operation of the image pickup device 30 by giving a timing signal to read the image signal thereto.

The CPU 40 also controls the stop SP of the image capturing lens 20 to obtain a desired aperture value. For moving one or more of the lens groups to achieve short-distance focusing, the CPU 40 executes driving control of the lens group or groups.

The RAM 72, the ROM 71, and the flash memory 73 are connected to the CPU 40 through the bus 60. In addition, a display controller 81 for controlling an LCD (Liquid Crystal Display) 80 to display images thereon, a memory I/F (InterFace) 91 for loading an external memory such as a memory card 90 therein, and an external I/F (InterFace) 101 for connecting an external device 100 such as an external DVD (Digital Versatile Disk) drive or the like are connected to the CPU 40 through the bus 60.

The imaging apparatus 10 may be in the form of any of various products including a digital still camera, a digital video camera, and a camera incorporated in any of various digital input/output devices including a cellular phone set combined with a camera, a PDA (Personal Digital Assistant) combined with a camera, etc.

Although certain preferred embodiments of the present invention have been shown and described in detail, it should be understood that various changes and modifications may be made therein without departing from the scope of the appended claims.

What is claimed is:

1. An image capturing lens comprising:
   in order from an object side, a first lens group having a negative refractive power;
   a stop; and
   a second lens group having a positive refractive power;
   said first lens group including, in order from the object side, a first lens in a meniscus shape having a convex surface which faces the object side and having a negative refractive power, and a second lens in a meniscus shape having a convex surface which faces the object side and having a positive refractive power, and
   said second lens group including, in order from the object side, a third lens in a double-convex shape having a positive refractive power, a fourth lens in a double-concave shape having a negative refractive power, and a fifth lens having a positive refractive power;
   wherein $0.9 < f3/f < 1.7$,
   where f denotes an overall focal length of said image capturing lens, and f3 denotes a focal length of said third lens of the second lens group.

2. The image capturing lens according to claim 1, satisfying the following conditional formula (1):

$$SagR1(ymax)/SagR2(ymax) > 0, \qquad (1)$$

where SagR1(ymax) denotes deformation of an aspherical surface with respect to a generating spherical surface on an object-side surface of said second lens at a maximum image height Ymax, and SagR2(ymax) denotes deformation on an image-side surface of said second lens at the maximum image height Ymax.

3. An imaging apparatus comprising:

an image capturing lens; and an image pickup device configured to convert an optical image formed by the image capturing lens into an electric signal;

wherein said image capturing lens includes, in order from an object side, a first lens group having a negative refractive power and a second lens group having a positive refractive power, said first lens group includes, in order from an object side, a first lens in a meniscus shape having a convex surface which faces the object side and having a negative refractive power, and a second lens in a meniscus shape having a convex surface which faces the object side and having a positive refractive power, and said second lens group including, in order from the object side, a third lens in a double-convex shape having a positive refractive power, a fourth lens in a double-concave shape having a negative refractive power, and a fifth lens having a positive refractive power;

wherein $0.9 < f3/f < 1.7$, where f denotes an overall focal length of said image capturing lens, and f3 denotes a focal length of said third lens of the second lens group.

4. The imaging apparatus according to claim 3, satisfying the following conditional formula (1):

$$SagR1(ymax)/SagR2(ymax) > 0, \quad (1)$$

where SagR1(ymax) denotes deformation of an aspherical surface with respect to a generating spherical surface on an object-side surface of said second lens at a maximum image height Ymax, and SagR2(ymax) denotes deformation on an image-side surface of said second lens at the maximum image height Ymax.

5. An image capturing lens comprising:

in order from an object side, a first lens group having a negative refractive power;

a stop; and a second lens group having a positive refractive power;

said first lens group including, in order from the object side, a first lens in a meniscus shape having a convex surface which faces the object side and having a negative refractive power, and a second lens in a meniscus shape having a convex surface which faces the object side and having a positive refractive power, and said second lens group including, in order from the object side, a third lens in a double-convex shape having a positive refractive power, a fourth lens in a double-concave shape having a negative refractive power, and a fifth lens having a positive refractive power;

wherein $1.4 < |F1/F2| < 2.5$, where F1 denotes a composite focal length of said first lens group, and F2 denotes a composite focal length of said second lens group.

6. An imaging apparatus comprising:

an image capturing lens; and an image pickup device configured to convert an optical image formed by the image capturing lens into an electric signal;

wherein said image capturing lens includes, in order from an object side, a first lens group having a negative refractive power and a second lens group having a positive refractive power, said first lens group includes, in order from an object side, a first lens in a meniscus shape having a convex surface which faces the object side and having a negative refractive power, and a second lens in a meniscus shape having a convex surface which faces the object side and having a positive refractive power, and said second lens group including, in order from the object side, a third lens in a double-convex shape having a positive refractive power, a fourth lens in a double-concave shape having a negative refractive power, and a fifth lens having a positive refractive power;

wherein $1.4 < |F1/F2| < 2.5$, where F1 denotes a composite focal length of said first lens group, and F2 denotes a composite focal length of said second lens group.

* * * * *